United States Patent
Jiang et al.

(10) Patent No.: US 12,142,797 B2
(45) Date of Patent: *Nov. 12, 2024

(54) BUTTON-TYPE BATTERY

(71) Applicant: Guangdong Mic-power New Energy Co., Ltd., Guangdong (CN)

(72) Inventors: Hao Jiang, Guangdong (CN); Zhiyong Chen, Guangdong (CN)

(73) Assignee: GUANGDONG MIC-POWER NEW ENERGY CO., LTD., Guangdong (CN)

( * ) Notice: Subject to any disclaimer, the term of this patent is extended or adjusted under 35 U.S.C. 154(b) by 29 days.

This patent is subject to a terminal disclaimer.

(21) Appl. No.: 18/299,882

(22) Filed: Apr. 13, 2023

(65) Prior Publication Data

US 2023/0246314 A1 Aug. 3, 2023

Related U.S. Application Data

(63) Continuation of application No. 16/874,783, filed on May 15, 2020, now Pat. No. 11,658,368.

(30) Foreign Application Priority Data

May 15, 2019 (CN) .......................... 201920704685.6

(51) Int. Cl.
*H01M 50/56* (2021.01)
*H01M 50/109* (2021.01)
(Continued)

(52) U.S. Cl.
CPC ......... *H01M 50/56* (2021.01); *H01M 50/109* (2021.01); *H01M 50/147* (2021.01);
(Continued)

(58) Field of Classification Search
CPC .. H01M 50/56; H01M 50/109; H01M 50/147; H01M 50/184; H01M 50/186;
(Continued)

(56) References Cited

U.S. PATENT DOCUMENTS 6,060,194 A * 5/2000 Lindner .............. H01M 50/109
429/185
2009/0325062 A1 12/2009 Brenner et al.
2015/0171462 A1* 6/2015 Hong .................. H01M 50/107
429/94

FOREIGN PATENT DOCUMENTS

CN 108550718 A 9/2018
CN 108832037 A 11/2018
(Continued)

*Primary Examiner* — Ula C Ruddock
*Assistant Examiner* — Sarika Gupta
(74) *Attorney, Agent, or Firm* — SALIWANCHIK, LLOYD & EISENSCHENK

(57) ABSTRACT

A button-type battery including a package assembly and a cell assembly is provided. In actual application, as part of a sealing wall is recessed inwards in a direction to a battery reservoir so as to form a locking boss, as such, when a battery cover is being assembled, the locking boss is pressed against part of a sealing plastic ring so that the part of the sealing plastic ring is in tight contact with a sealing edge, and a battery cup can be locked to the battery cover by means of the locking boss, thereby preventing easy detachment of the battery cover from the battery cup to cause exposure of a rolled cell. The battery cover is applied with a strong locking force from the battery cup, greatly improving the safety of the button-type battery.

18 Claims, 2 Drawing Sheets

(51) Int. Cl.
  *H01M 50/147* (2021.01)
  *H01M 50/184* (2021.01)
  *H01M 50/186* (2021.01)
  *H01M 50/531* (2021.01)

(52) U.S. Cl.
  CPC ....... *H01M 50/184* (2021.01); *H01M 50/186* (2021.01); *H01M 50/531* (2021.01)

(58) Field of Classification Search
  CPC ... H01M 50/531; H01M 50/153; Y02P 70/50; Y02E 60/10
  See application file for complete search history.

(56) References Cited

FOREIGN PATENT DOCUMENTS

| | | |
|---|---|---|
| CN | 208819929 U | 5/2019 |
| CN | 110336065 A | 10/2019 |
| DE | 102005058132 A1 | 6/2007 |

* cited by examiner

BUTTON-TYPE BATTERY

CROSS-REFERENCE TO RELATED APPLICATION

This application is a continuation application of co-pending U.S. patent application Ser. No. 16/874,783, filed May 15, 2020; which claims priority to Chinese Patent Application No. 201920704685.6, filed on May 15, 2019, which is hereby incorporated by reference in its entirety.

TECHNICAL FIELD

The present disclosure relates to the technical field of batteries, and more specifically, to a button-type battery.

BACKGROUND

Currently, a battery, in the form of a cup, a reservoir, a container, or partial space in a complex container that contains an electrolyte and a metal electrode to generate current, refers to a device that can convert chemical energy into electrical energy. The battery has an anode and a cathode. With the advancement of technology, the battery generally refers to a small device that can generate electrical energy, such as a solar cell. Performance parameters of the battery mainly include electromotive force, capacity, specific energy and resistance. Using the battery as an energy source, a stable voltage, a stable current, a long-term stable power supply, and a current less influenced by the environment can be obtained. The battery has a simple structure, is portable, is easy to charge and discharge, is not influenced by weather and temperature, and has stable and reliable performance, playing a great role in all aspects of modern social life.

An existing battery structure includes a battery cover, a battery cup, a rolled cell and a plastic ring. The battery cover is arranged over the battery cup, the battery cover and the battery cup together enclose a battery cavity, the rolled cell is arranged in the battery cavity, and the plastic ring is arranged between the battery cover and the battery cup. However, in the existing battery structure, as the battery cover or the battery cup is not provided with a corresponding stopper, the battery cover is easily detached from the battery cup, resulting in exposure of the rolled cell, which leads to a significant potential security risk; in addition, since there is an electrolyte in the rolled cell, if the rolled cell is exposed and collided with an external object, it will easily cause the electrolyte to erupt, seriously endangering personal safety of a user.

SUMMARY

The present disclosure aims to address the drawbacks in the prior art, and to provide a button-type battery which can prevent a battery cover from being detached from a battery cup to cause the exposure of a rolled cell, the battery applies a strong locking force from the battery cup to the battery cover and greatly improves safety.

The purpose of the present disclosure is achieved by the following technical solutions:

a button-type battery, comprising:

a package assembly including: a battery cup including a sealing base and a sealing wall connected with each other, the sealing base and the sealing wall together forming a battery reservoir, and part of the sealing wall being recessed inwards in a direction to the battery reservoir so as to form a locking boss; a sealing plastic ring clamped onto the sealing wall; and a battery cover including a cap and a sealing edge connected with each other, part of the sealing edge being accommodated in the sealing plastic ring and the locking boss being pressed against part of the sealing plastic ring, so that the part of the sealing plastic ring is in tight contact with the sealing edge; and a cell assembly including a rolled cell and an electrode tab, the rolled cell being disposed in the battery reservoir, the electrode tab being connected to the rolled cell and also connected with the sealing base and the cap respectively.

In an embodiment, the locking boss specifically includes a plurality of locking protrusions, each of the locking protrusions being pressed against the part of the sealing plastic ring so that the part of the sealing plastic ring is in tight contact with the sealing edge.

In an embodiment, each of the locking protrusions is equally distributed on the sealing wall.

In an embodiment, the sealing plastic ring comprises a plastic circumference of the sealing wall and a U-shaped accommodating ring connected with each other, the part of the sealing edge being accommodated in the U-shaped accommodating ring, the locking boss being pressed against part of the plastic circumference of the sealing wall, so that the part of the plastic circumference of the sealing wall is in tight contact with the sealing edge.

In an embodiment, the plastic circumference of the sealing wall and the U-shaped accommodating ring are of an integrally formed structure.

In an embodiment, the cell assembly further includes a central post located in a clearance hole provided in the rolled cell, an end of the central post being pressed against the electrode tab.

In an embodiment, the clearance hole is located at the middle of the rolled cell.

In an embodiment, the electrode tab specifically includes an anode tab and a cathode tab, the anode tab being connected to the rolled cell and the cap respectively, the cathode tab being connected to the rolled cell and the sealing base respectively, and the central post including a front post and a rear post connected with each other, the front post being pressed against the anode tab, and the rear post being pressed against the cathode tab.

In an embodiment, an anode insulator is provided between the front post and the anode tab.

In an embodiment, a cathode insulator is provided between the rear post and the cathode tab.

Advantages and beneficial effects of the present disclosure compared with the prior art are as follows:

The button-type battery of the present disclosure is provided with a package assembly and a cell assembly. In the actual application, as part of the sealing wall is recessed inwards in the direction to the battery reservoir so as to form the locking boss, and as such, when the battery cover is being assembled, the locking boss is pressed against the part of the sealing plastic ring so that the part of the sealing plastic ring is in tight contact with the sealing edge, and the battery cup can be locked to the battery cover by the locking boss, thereby preventing easy detachment of the battery cover from the battery cup to cause exposure of the rolled cell. The battery cover is applied with a strong locking force from the battery cup, greatly improving the safety of the button-type battery.

BRIEF DESCRIPTION OF THE DRAWINGS

In order to explain the technical solutions of the embodiments of the present disclosure more clearly, the embodiments with reference to the drawings if required will be briefly illustrated. It should be understood that the drawings hereinafter only show some embodiments of the present disclosure, and should not be seen as limitations to the scope of protection. For those of ordinary skill in the art, other related drawings can be obtained based on these drawings without creative work.

DETAILED DESCRIPTION

In order to facilitate understanding of the present disclosure, the present disclosure will be described more comprehensively below with reference to related drawings. The drawings show preferred embodiments of the present disclosure. However, the present disclosure can be implemented in many different fashions, and is not limited to the embodiments described herein. On the contrary, the purpose of providing these embodiments is to disclose the present disclosure more thoroughly and comprehensively.

It should be noted that when an element is referred to be "fixed" to another element, it can be directly on the other element or there can be an interposed element. When an element is considered to be "connected" to another element, it may be directly connected to the other element or there can be an interposed element. The terms "vertical", "horizontal", "left", "right" and similar expressions used herein are for illustrative purposes only and are not meant to be the only embodiments.

Unless otherwise defined, all technical and scientific terms used herein have the same meaning as commonly understood by those skilled in the technical field of the present disclosure. The terminology used in the description of the present disclosure herein is for the purpose of describing specific embodiments, and is not intended to limit the present disclosure. The term "and/or" as used herein includes any and all combinations of one or more related items.

Figure 1:
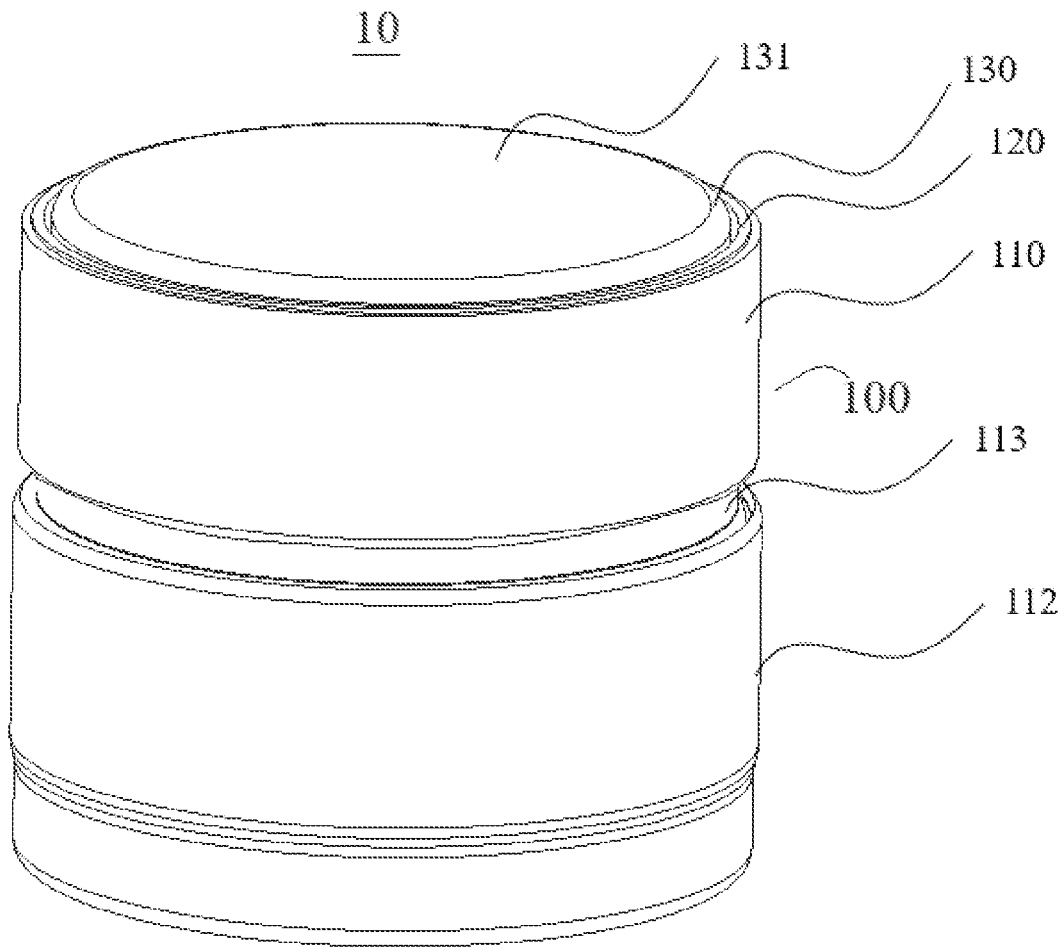
FIG. 1 is a schematic structural diagram of a button-type battery according to an embodiment of the present disclosure.
Figure 2:
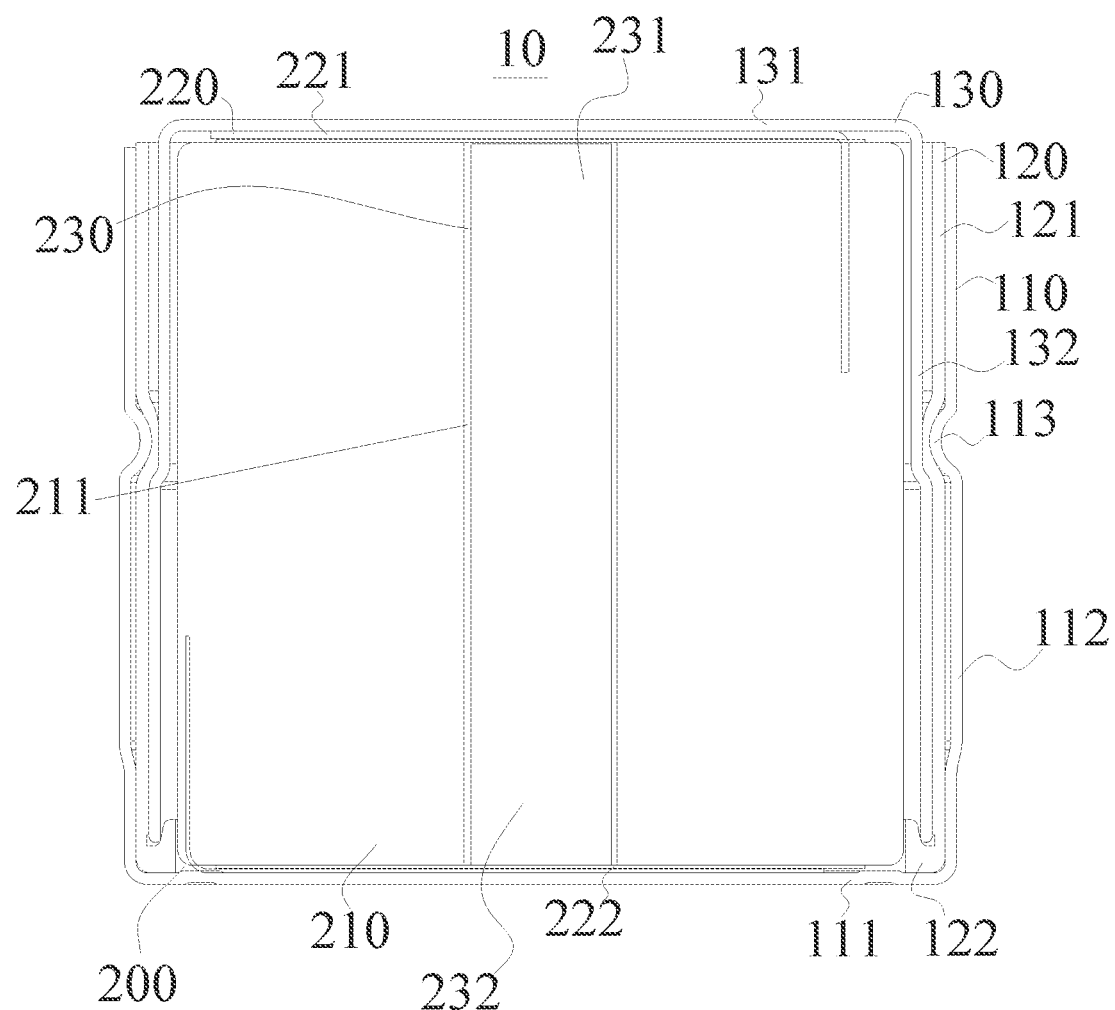
FIG. 2 is a schematic diagram of an internal structure of a button-type battery according to an embodiment of the present disclosure.

Please refer to FIGS. 1 and 2 for a button-type battery 10 including a package assembly 100 and a cell assembly 200.

It should be noted that the package assembly 100 functions to package and protect; the cell assembly 200 functions to output voltage for supplying external electrical equipment with power.

Please refer to FIG. 2 again. The package assembly 100 includes a battery cup 110, a sealing plastic ring 120 and a battery cover 130. The battery cup 110 includes a sealing base 111 and a sealing wall 112 connected with each other, the sealing base 111 and the sealing wall 112 together forming a battery reservoir. Part of the sealing wall 112 is recessed inwards in a direction to the battery reservoir so as to form a locking boss 113. The sealing plastic ring 120 is clamped onto the sealing wall 112. The battery cover 130 includes a cap 131 and a sealing edge 132 connected with each other. Part of the sealing edge 132 is accommodated in the sealing plastic ring 120, and the locking boss 113 is pressed against part of the sealing plastic ring 120, so that the part of the sealing plastic ring 120 is in tight contact with the sealing edge 132.

It should be noted that in actual application, as part of the sealing wall 112 is recessed inwards in a direction to the battery reservoir so as to form the locking boss 113, as such, when the battery cover 130 is being assembled, the locking boss 113 is pressed against the part of the sealing plastic ring 120 so that the part of the sealing plastic ring 120 is in tight contact with the sealing edge 132, and the battery cup 110 can be locked to the battery cover 130 by the locking boss 113, thereby preventing easy detachment of the battery cover 130 from the battery cup 110 to cause exposure of a rolled cell. The battery cover 130 is applied with a strong locking force from the battery cup 110, greatly improving the safety of the button-type battery 10.

It should also be noted that when there is excessive air pressure inside the battery reservoir, the battery cover 130 can be detached from the battery cup 110 by the action of the air pressure. Thus, pressure is timely relieved so as to prevent the button-type battery 10 from operating under excessive air pressure inside the battery reservoir.

Please refer to FIG. 2 again. The cell assembly 200 includes a rolled cell 210 and an electrode tab 220. The rolled cell 210 is disposed in the battery reservoir, the electrode tab 220 is connected to the rolled cell 210, and the electrode tab 220 is also connected to the sealing base 111 and the cap 131 respectively.

It should be noted that the voltage output from the rolled cell 210 is aggregated to an external power supply device through the electrode tab 220; in addition, since the electrode tab 220 is connected to the sealing base 111 and the cap 131 respectively, an electrode of the button-type battery 10 can be led out by a user from the sealing base 111 and the cap 131.

Further, in an embodiment, the locking boss 113 specifically includes a plurality of locking protrusions, each locking protrusion being pressed against part of the sealing plastic ring 120 so that the part of the sealing plastic ring 120 is in tight contact with the sealing edge 132.

It should be noted that the locking boss 113 can be processed into a plurality of discontinuous locking protrusions. The locking boss 113 includes a plurality of locking protrusions, each locking protrusion being pressed against part of the sealing plastic ring 120 so that the part of the sealing plastic ring 120 is in tight contact with the sealing edge 132. That is, the locking boss 113 includes the plurality of discontinuous locking protrusions, each locking protrusion being used to press against the sealing plastic ring 120. When there is only one locking boss 113 on the battery cup 110, the locking boss 113 includes a continuous boss, which play the same role as the discontinuous locking protrusions although apparently different. Specifically, the locking protrusions are equally distributed on the sealing wall 112.

Still further, please refer to FIG. 2 again. In an embodiment, the sealing plastic ring 120 includes a plastic circumference 121 of the sealing wall and a U-shaped accommodating ring 122 connected with each other, and the part of the sealing edge 132 is accommodated in the U-shaped accommodating ring 122. The locking boss is pressed against part of the plastic circumference 121 of the sealing wall so that the part of the plastic circumference 121 of the sealing wall is in tight contact with the sealing edge 132.

It should be noted that both of the plastic circumference 121 of the sealing wall and the U-shaped accommodating ring 122 are waterproof, and improve waterproof performance of the button-type battery 10. Specifically, the plastic circumference 121 of the sealing wall and the U-shaped accommodating ring 122 are formed integrally. It should be noted that the integrally formed structure of the plastic circumference 121 of the sealing wall and the U-shaped accommodating ring 122 can extend the overall service life of the sealing plastic ring 120.

Still further, please refer to FIG. 2 again. In an embodiment, the cell assembly 200 further includes a central post 230. A clearance hole 211 is provided in the rolled cell 210, the central post 230 is located in the clearance hole 211, and an end of the central post 230 is pressed against the electrode tab 220.

It should be noted that the central post 230 functions to support and protect, to prevent the battery cover 130 from being pressed down too much to compress the rolled cell 210; at the same time, the central post 230 can prevent the rolled cell 210 from expanding.

Still further, please refer to FIG. 2 again. In an embodiment, a clearance hole 211 is located at the middle of the rolled cell 210.

It should be noted that the clearance hole 211 is located at the middle of the rolled cell 210 so that the central post 230 and the rolled cell 210 are under uniform stress.

Still further, please refer to FIG. 2 again. In an embodiment, the electrode tab 220 specifically includes an anode tab 221 and a cathode tab 222. The anode tab 221 is connected to the rolled cell 210 and the cap 131 respectively, and the cathode tab 222 is connected to the rolled cell 210 and the sealing base 111 respectively. The central post 230 includes a front post 231 and a rear post 232 connected with each other. The front post 231 is pressed against the anode tab 221, and the rear post 232 is pressed against the cathode tab 222.

It should be noted that the voltage output from the rolled cell 210 is output through the anode tab 221 and the cathode tab 222.

Still further, in an embodiment, an anode insulator is provided between the front post 231 and the anode tab 221.

As such, it should be noted that the anode insulator functions to insulate.

Still further, in an embodiment, a cathode insulator is provided between the rear post 232 and the cathode tab 222.

As such, it should be noted that the cathode insulator functions to insulate.

The button-type battery of the present disclosure is provided with a package assembly and a cell assembly. In the actual application, as part of the sealing wall is recessed inwards in a direction to the battery reservoir so as to form a locking boss, as such, when the battery cover is being assembled, the locking boss is pressed against the part of the sealing plastic ring so that the part of the sealing plastic ring is in tight contact with the sealing edge, and the battery cup can be locked to the battery cover by means of the locking boss, thereby preventing easy detachment of the battery cover from the battery cup to cause exposure of the rolled cell. The battery cover is applied with a strong locking force from the battery cup, greatly improving the safety of the button-type battery.

The above-mentioned embodiments are only several embodiments of the present disclosure, and descriptions thereof are specific and detailed, but they should not be construed as limiting the scope of the present disclosure. It should be noted that for those of ordinary skill in the art, a number of modifications and improvements falling within the protection scope of the present disclosure can also be implemented without departing from the concept of the present disclosure. Therefore, the protection scope of the present disclosure shall be subject to the appended claims.

The invention claimed is:

1. A button-type battery, comprising: a package assembly comprising: a battery cup comprising a sealing base and a sealing wall extending from the sealing base, the sealing base and the sealing wall together forming a battery reservoir, and a part of the sealing wall being recessed inwards in a direction to the battery reservoir so as to form a locking boss; a sealing plastic ring clamped onto the sealing wall; and a battery cover comprising a cap and a sealing edge extending from the cap, a part of the sealing edge being accommodated in the sealing plastic ring, and the locking boss being pressed against a part of the sealing plastic ring, so that the part of the sealing plastic ring is in contact with the sealing edge, wherein the part of the sealing wall of the battery cup protrudes toward the sealing plastic ring in a radial direction to form the locking boss;

wherein the locking boss presses the part of the sealing plastic ring that is in contact with the sealing edge of the battery cover in a radial direction of the button-type battery.

2. The button-type battery according to claim 1, wherein comprises a cell assembly comprising a rolled cell and an electrode tab, the rolled cell being disposed in the battery reservoir, the electrode tab being connected to the rolled cell and also connected to the sealing base and the cap respectively.

3. The button-type battery according to claim 1, wherein the sealing plastic ring comprises a plastic circumference of the sealing wall and a U-shaped accommodating ring extending from the plastic circumference of the sealing wall, the part of the sealing edge being accommodated in the U-shaped accommodating ring.

4. The button-type battery according to claim 3, wherein the plastic circumference of the sealing wall and the U-shaped accommodating ring are of an integrally formed structure.

5. The button-type battery according to claim 3, the locking boss presses against a part of the plastic circumference of the sealing wall, so that part of the plastic circumference of the sealing wall is in contact with the sealing edge.

6. The button-type battery according to claim 2, wherein the cell assembly further comprises a central post located in a clearance hole provided in the rolled cell, an end of the central post being pressed against the electrode tab.

7. The button-type battery according to claim 6, wherein the clearance hole is located at the middle of the rolled cell.

8. The button-type battery according to claim 6, wherein the electrode tab comprises an anode tab and a cathode tab, and the central post comprising a first end and a second end, the first end being pressed against the anode tab, and the second end being pressed against the cathode tab.

9. The button-type battery according to claim 8, wherein an anode insulator is provided between the first end of the central post and the anode tab.

10. The button-type battery according to claim 8, wherein a cathode insulator is provided between the second end of the central post and the cathode tab.

11. The button-type battery according to claim 1, wherein at a side of the locking boss close to an opening of the battery reservoir, the sealing wall is parallel to the sealing edge.

12. The button-type battery according to claim 1, wherein the sealing wall is not crimped at an opening of the battery reservoir.

13. The button-type battery according to claim 1, wherein the cap protrudes outward from an opening of the battery reservoir.

14. The button-type battery according to claim 1, wherein the locking boss is located in the middle of the sealing wall.

15. The button-type battery according to claim 1, wherein the locking boss is located at a part of the sealing wall close to the sealing base.

16. The button-type battery according to claim 1, wherein the sealing edge forms a step structure recessed inwardly at a position opposite to the locking boss.

17. The button-type battery according to claim 1, wherein the sealing base comprises a protrusion protruding toward the battery reservoir.

18. The button-type battery according to claim 17, wherein the locking boss is located at a part of the sealing wall close to the sealing base, and the sealing plastic ring is located between the protrusion and the locking boss.

* * * * *